R. W. EGAN.
TOOL HOLDER.
APPLICATION FILED APR. 16, 1914.
1,179,511.
Patented Apr. 18, 1916.
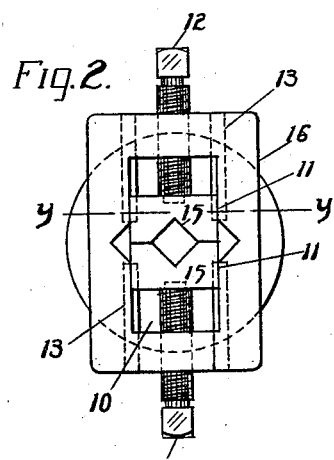
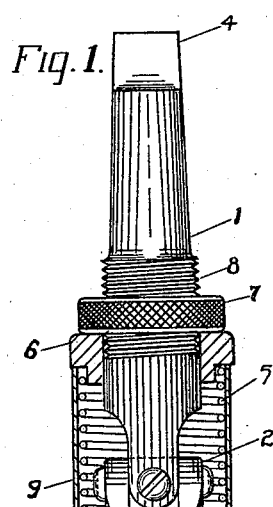
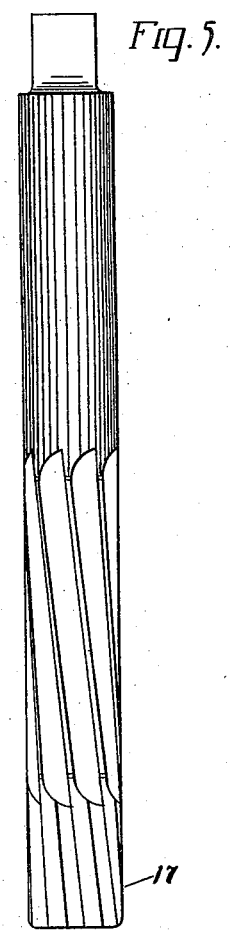
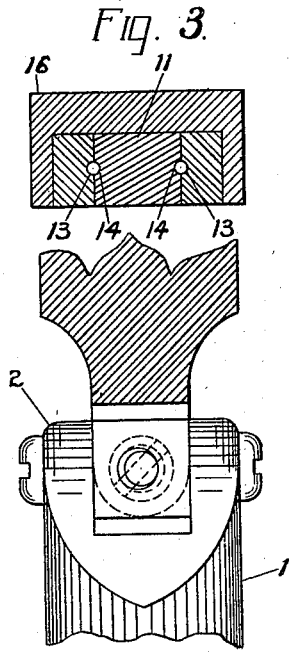
WITNESSES
INVENTOR
Raymond W. Egan
By J. C. Grimes
His Atty.

UNITED STATES PATENT OFFICE.

RAYMOND W. EGAN, OF CINCINNATI, OHIO.

TOOL-HOLDER.

1,179,511.  Specification of Letters Patent.  Patented Apr. 18, 1916.

Application filed April 16, 1914. Serial No. 832,267.

*To all whom it may concern:*

Be it known that I, RAYMOND W. EGAN, a citizen of the United States, residing in the city of Cincinnati, county of Hamilton, and State of Ohio, have invented a certain new and useful Improvement in Tool-Holders, of which the following is a specification.

My invention relates to an improvement in that class of holders adapted to holding drills, reamers, taps and other similar tools; and the object in view is to provide a tool holder which may be mounted in a machine spindle and which is adapted for holding various tools in such operative relation to the machine spindle, that the tool may take a working position either in or out of alinement with the axial line of the spindle and either parallel with said axial line or at an angle thereto, to compensate for any variations or inaccuracies in the hole operated in or upon. I attain this object by the device illustrated in the accompanying drawings in which—

Figure 1 represents a vertical view of my improved device partly in section and partly in side elevation. Fig. 2 is an inverted plan view of the tool holding member. Fig. 3 is a sectional view of the tool holding member on line *y y* of Fig. 2. Fig. 4 is an enlarged view of one of the universal joints in the shank of the chuck showing one of the prongs of the fork broken away, and Fig. 5 is a reamer for use in connection with the chuck.

In the drawings 1 represents the shank of the chuck. The shank is provided in its central portion with suitable joints 2, and at its lower end with a tool holding member 3 for holding the tool. The upper end 4 of the shank is formed to connect with a machine spindle. Tension is given to the shank by means of the spring 5, surrounding the shank and bearing against the upper side of the tool retaining member 3 and against the lower side of the collar 6, which fits over the upper part of the shank and which is held in place by the nut 7 on the threaded portion 8 of the shank. The tension of the shank may be increased and decreased by adjusting the nut 7.

In the drawings I have shown the shank covered by a casing 9, which is preferably made of leather. The casing may be made of any other suitable material, or it may be omitted altogether.

The tool holding member 3 comprises a casing 16 which is provided with an opening 10 for receiving the tool holding jaws 11. The jaws 11 are provided with notches 15 for receiving the tool and are operated by means of the screws 12 passing through the ends of the casing 16 and into the outer edges of the jaws 11. The jaws 11 are held in position and slide upon the pins 13, which are supported in the casing 16 and which fit into the grooves 14 in the sides of the jaws 11.

The joints 2 are the ordinary universal joints now in common use, and it is not thought necessary to describe them in detail.

My improved chuck may be used for drilling, tapping and all analogous purposes, but it is designed primarily for reaming and may be most successfully used in connection with a spiral reamer having a guiding portion 17 as illustrated in Fig. 5.

Assuming that a hole is to be reamed and that the chuck is mounted in a suitable machine spindle, and a reamer is secured in the chuck, the spindle is then fed downward until the reamer enters the hole to be reamed. The flexibility of the shank will permit the reamer to yield in any direction from the axial line of the spindle and, therefore, accurately follow and cut equally upon all sides of the hole being worked in or upon, and thus make a perfectly true hole. The guiding portion 17 of the reamer will hold the reamer at all times in an exact vertical position in the hole.

As I have shown my chuck in the drawings, I secure flexibility in the shank by using two ordinary universal joints. I, however, do not limit myself to the particular means shown. Any other suitable means of securing flexibility may be employed.

What I claim and desire to secure by Letters Patent is—

1. In a tool of the class described the combination of a driving and a driven member, a flexible connection between said members and tensioning means for the connection.

2. A tool of the class described, having a shank comprising a series of universal joints, a tool holding member for holding reamers, drills, taps and other similar tools on the lower end of the shank, and tensioning means for the shank.

3. A tool of the class described having a shank comprising a series of universal joints, a tool holding member for holding reamers, drills, taps and other similar tools on the lower end of the shank, tensioning means for the shank, and means for increasing and decreasing the tension.

4. A tool of the class described having a shank comprising a series of universal joints, one end of the shank being arranged for connecting with a machine spindle, a tool holding member secured to the other end of the shank, a threaded portion of the shank, a collar taking around the shank, a spring surrounding the shank and bearing against the tool holding member and the collar and a nut on the shank above the collar by means of which the tension of the spring may be increased and decreased.

RAYMOND W. EGAN.

Witnesses:
LENNIE FLINCHPAUGH,
R. D. COAN.

Copies of this patent may be obtained for five cents each, by addressing the "Commissioner of Patents, Washington, D. C."